United States Patent
Reuter et al.

(10) Patent No.: US 7,976,109 B2
(45) Date of Patent: Jul. 12, 2011

(54) FAILSAFE OPERATION OF A HYBRID BRAKE SYSTEM FOR A VEHICLE

(75) Inventors: David F. Reuter, Beavercreek, OH (US);
E. Wayne Lloyd, Lebanon, OH (US);
Deron C. Littlejohn, West Bloomfield, MI (US)

(73) Assignee: BWI Company Limited S.A., Luxembourg (LU)

( * ) Notice: Subject to any disclaimer, the term of this patent is extended or adjusted under 35 U.S.C. 154(b) by 2175 days.

(21) Appl. No.: 10/681,638

(22) Filed: Oct. 8, 2003

(65) Prior Publication Data
US 2004/0135432 A1    Jul. 15, 2004

Related U.S. Application Data

(60) Provisional application No. 60/439,935, filed on Jan. 14, 2003.

(51) Int. Cl.
*B60T 8/42* (2006.01)
(52) U.S. Cl. ........ 303/115.2; 303/3; 303/9.63; 303/9.71
(58) Field of Classification Search ............... 303/152, 303/113.4, 3, 7–9, 20, 9.71, 13–18, 9.63, 303/2, 122.04–122.14, 115.2, 9.61, 114.1, 303/113.5, 186, DIG. 3, DIG. 4, 166; 188/349, 188/106 P, 106 R, 156, 158, 151 A; 701/76, 701/92, 70, 80
See application file for complete search history.

(56) References Cited

U.S. PATENT DOCUMENTS

| | | | | |
|---|---|---|---|---|
| 4,629,258 A | * | 12/1986 | Resch et al. | 303/122.13 |
| 4,740,039 A | * | 4/1988 | Hattwig | 303/9.75 |
| 5,127,713 A | * | 7/1992 | Birkenbach | 303/113.1 |
| 5,150,951 A | * | 9/1992 | Leiber et al. | 303/186 |
| 5,558,415 A | * | 9/1996 | Buschmann et al. | 303/186 |
| 5,658,057 A | * | 8/1997 | Ohnuma et al. | 303/119.2 |
| 6,431,662 B2 | * | 8/2002 | Isono et al. | 303/114.3 |

FOREIGN PATENT DOCUMENTS
WO    WO 00/66410    3/2000

OTHER PUBLICATIONS
Translation of submitted WO 00/66410 from USPTO STIC.*

* cited by examiner

*Primary Examiner* — Pam Rodriguez
(74) *Attorney, Agent, or Firm* — Dickinson Wright PLLC

(57) ABSTRACT

A hybrid brake apparatus for a vehicle includes a front hydraulically actuated brake circuit, a rear electrically actuated brake circuit, and a controller. The front hydraulically actuated brake circuit includes a master cylinder for providing pressurized fluid to the front brake circuit in response to an input applied to the master cylinder for applying a frictional front braking force. The rear electrically actuated brake circuit is controllable in response to the input for providing a frictional rear braking force. The rear brake circuit is controlled in accordance with a first predetermined relationship between the input and rear braking force during normal operation of the front brake circuit. If the controller detects a degradation of front braking force, the rear brake circuit is controlled in accordance with a second predetermined relationship between the input and the rear braking force, to thereby compensate for the degradation of front braking force.

18 Claims, 11 Drawing Sheets

FAILSAFE OPERATION OF A HYBRID BRAKE SYSTEM FOR A VEHICLE

RELATED APPLICATIONS

This application claims the benefit of U.S. Provisional Application No. 60/439,935, filed Jan. 14,2003, entitled CONTROLLED BRAKE SYSTEMS FOR VEHICLES by David F. Reuter, et al."

TECHNICAL FIELD OF THE INVENTION

This invention relates to vehicle brakes, and more particularly to failsafe operation of a hybrid brake system having front hydraulic brakes and rear electrically actuated brakes.

BACKGROUND OF THE INVENTION

Since the mid 1930s, vehicles such as automobiles and light trucks have predominantly utilized hydraulic brake systems having a pedal operated master cylinder supplying pressurized hydraulic fluid to disk or drum braking devices at each wheel.

Early hydraulic brake systems utilized a single hydraulic fluid circuit supplying pressurized fluid from the master cylinder to all four corners of the vehicle. A break in the fluid circuit anywhere rendered the entire hydraulic brake system inoperative.

In order to prevent a total loss of hydraulic braking in the event of a failure of part of the system, failsafe hydraulic split brake systems were developed that provided two separate fluid circuits from the master cylinder, configured such that a failure of either of the two fluid circuits would still leave hydraulic brakes operative on at least two corners of the vehicle. In rear wheel drive automobiles and light trucks, one fluid circuit typically served the front wheels, and the other fluid circuit served the rear wheels, to provide a front/rear (F/R) failsafe hydraulic split system. Front wheel drive vehicles typically used a diagonal failsafe hydraulic split system, having one front corner and the diagonally opposite rear corner of the vehicle on one fluid circuit, and the other front corner and its diagonally opposite rear corner on the second fluid circuit. These failsafe provisions were incorporated into government regulations that required brake systems to be configured such that a single failure of the braking system would still leave the brakes on at least two corners of the vehicle operational.

In the years since hydraulic brake systems became the norm, many additional features have been added to further enhance safe operation and optimize vehicle performance. Modem brake systems often include a booster that amplifies force exerted on the brake pedal, to provide power brakes that allow a person operating the vehicle to control the brakes with significantly less force on the brake pedal than is required in a non-boosted brake system. Anti-lock brake systems (ABS) were developed in which valves controlling fluid flow to each corner of the vehicle were pulsed, in response to signals received from rotation sensors monitoring each wheel, to preclude locking the brakes on slippery road surfaces. Traction control systems (TCS) were added that controlled both the brakes and the engine throttle setting to improve traction and handling of the vehicle during maneuvers, such as acceleration or turning, when the brakes are not being applied by the operator. Vehicle dynamics control (VDC) further advanced the level of sophistication of brake systems to utilize a number of sensors throughout the vehicle, and a more advanced onboard computer with higher throughput, to monitor forces acting on the vehicle, together with inputs indicating operational commands from the operator applied to the steering, braking, and drive systems. VDC analyzes the data received from the sensors and coordinates operation of the various elements of the vehicle brake system, power-train, and suspension to provide enhanced vehicle safety or performance of the vehicle.

The addition of all of these enhancements has made hydraulic brake systems more complex. Numerous valves, sensors, and electronic control components are required.

Recent advances in technology have made it feasible to develop a brake system that utilizes electrically actuated brakes, rather than hydraulic brakes, on at least the rear corners of a vehicle. Utilizing electrically actuated brakes allows a number of the components currently required in fully hydraulic brake systems to be eliminated, particularly the interconnecting brake pipes, thereby resulting in ease of installation for the vehicle assembly plants. Hydraulic brake systems must be carefully filled with fluid, to preclude trapping air in the hydraulic lines that would interfere with operation, thereby increasing manufacturing complexity, time and cost. Electrically actuated brakes eliminate the manufacturing complexity, time and cost associated with filling the fluid lines in hydraulic brake systems. Electrically actuated brakes also provide opportunities for additional functionality, such as electrical park brake capability, and improved operational performance in modern brake systems.

Modern brake systems rely heavily on electronic controls to coordinate and control functions such as ABS, TCS, and VDC, making it logical to move toward an all-electric brake system. Most modern automobiles and light trucks utilize a 12 volt electrical system. While 12 volt electrically actuated brakes are currently feasible for rear brakes, it is generally accepted by those having skill in the art, that front electrically actuated brakes would need to be operated at a higher voltage, such as the proposed 42 volt systems now in development, to be able to cost-effectively manage the higher power levels required. The higher voltage is required because the front brakes handle a significantly higher percentage of the braking load than the rear brakes. As a generally accepted rule of thumb, the front brakes provide ⅔ of the stopping power, and the rear brakes provide the remaining ⅓ when both the front and rear brakes are operating for a moderate vehicle deceleration.

Providing a hybrid brake apparatus having electrically actuated brakes on the rear of a vehicle and hydraulic front brakes reduces the work load on the hydraulic brake system by approximately ⅓, thereby allowing components in the hydraulic portion of the hybrid system to be downsized, thereby saving cost, space, and weight. Reducing the required work on the hydraulic portion of the system may also make it possible to more readily achieve a "car-like" feel to the brake pedal on light duty trucks.

A hybrid brake apparatus having front hydraulically actuated brakes and rear electrically actuated brakes presents previously unforeseen challenges to failsafe operation, which were not presented by all-hydraulic brake systems. These new challenges necessitate new approaches to providing failsafe construction and operation of a hybrid brake apparatus.

What is needed, therefore, is a hybrid brake apparatus having front hydraulically actuated brakes and rear electrically actuated brakes, that meets or exceeds the safety requirements previously applied to all-hydraulic brake systems, and providing performance capabilities that are as good as or better than prior all-hydraulic brake systems. Such a hybrid brake apparatus should also be applicable to a brake system including functions such as ABS, TCS, and VDC. It is also highly desirable that the hybrid brake apparatus have the same or better operational feel to a driver applying force to the brake pedal, as a conventional all-hydraulic brake system.

SUMMARY OF THE INVENTION

Our invention provides a hybrid brake apparatus, meeting the requirements discussed above, having a front hydraulically actuated brake circuit, a rear electrically actuated brake circuit, and a controller. The front hydraulically actuated brake circuit includes a master cylinder for providing pressurized fluid to the front brake circuit in response to an input applied to the master cylinder, for applying a frictional front braking force. The rear electrically actuated brake circuit is controllable in response to the input applied to the master cylinder, for applying a frictional rear braking force. The controller controls the rear brake circuit in accordance with a first predetermined relationship between the input and rear braking force during normal operation of the front brake circuit. If the controller detects a degradation of front braking force, the controller controls the rear brake circuit in accordance with a second predetermined relationship between the input and the rear braking force, to thereby compensate for the degradation of front braking force.

Some forms of our invention may also include additional control sensors, such as pressure sensors, force transducers, wheel speed sensors, or a brake pedal travel sensor, for communicating the input to the controller, and allowing the controller to detect a degradation of braking force in the front hydraulically actuated brake circuit.

The hydraulic brake circuit may further include a pedal feel emulator for emulating the normally experienced pedal force and movement of a brake pedal, during periods of operation when the front braking force is degraded.

The front hydraulically actuated brake circuit may also include a first and a second hydraulic circuit, and the master cylinder may include a first and a second movable piston, with the first piston operatively connected for providing front braking force by supplying pressurized fluid to the first hydraulic circuit in response to the input, and the second movable piston operatively connected for supplying pressurized fluid to the second hydraulic circuit in response to the input.

In some forms of our invention, the second hydraulic circuit does not supply pressurized fluid for use in generating a frictional front braking force, and a pressure sensor is operatively connected to only the second hydraulic circuit for monitoring pressure generated by the second piston of the master cylinder.

In some forms of our invention, the front hydraulically actuated brake circuit includes a first and a second hydraulic circuit, and the master cylinder includes a first and a second movable piston. The first piston is operatively connected for providing front braking by supplying pressurized fluid to only the first hydraulic circuit in response to the input, and the second movable piston is operatively connected for providing front braking force by supplying pressurized fluid to only the second hydraulic circuit in response to the input. A pressure sensor may be operatively connected to only the first hydraulic circuit for monitoring pressure generated by the first piston of the master cylinder.

Our invention may also take the form of a method for failsafe operation of a hybrid brake apparatus brake described herein.

The foregoing and other features and advantages of our invention will become further apparent from the following detailed description of exemplary embodiments, read in conjunction with the accompanying drawings. The detailed description and drawings are merely illustrative of our invention rather than limiting, the scope of the invention being defined by the appended claims and equivalents thereof.

DETAILED DESCRIPTION

Figure 1:
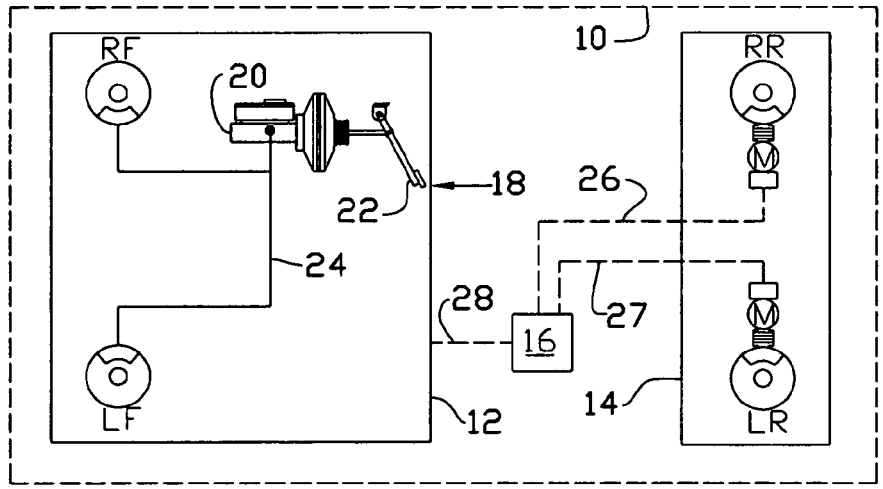
FIG. 1 is a schematic representation of a first embodiment of a brake apparatus according to our invention, providing a Front/Rear/Rear (F/R/R) split failsafe hybrid brake system for a four wheeled vehicle, having a rear electrically actuated brake circuit, and a single front hydraulic circuit providing pressurized fluid to a left and a right front braking device.
Figure 2:
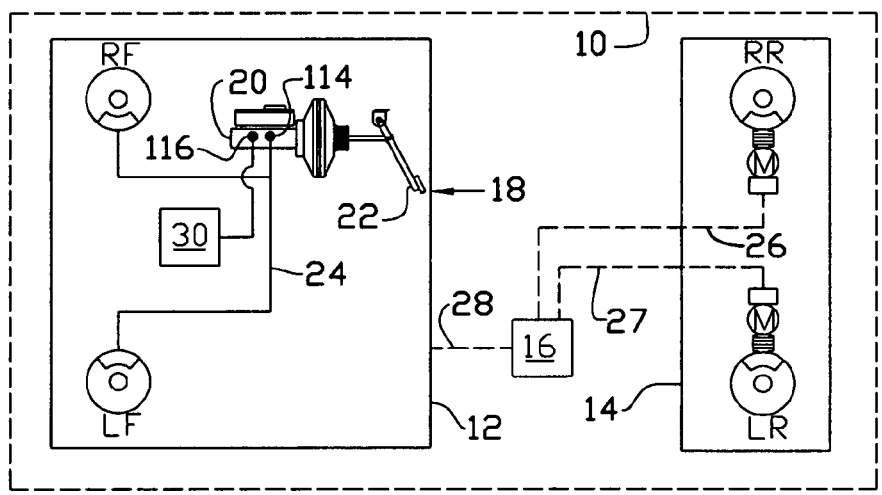
FIG. 2 is a schematic representation of a second embodiment of a brake apparatus according to our invention, providing a Front/Rear/Rear (F/R/R) split failsafe hybrid brake system, having a rear electrically actuated brake circuit, and a front hydraulically actuated brake circuit including a first and a second hydraulic circuit, but having only the first hydraulic brake circuit connected for providing front braking force, and a rear electrically actuated brake circuit.
Figure 3:
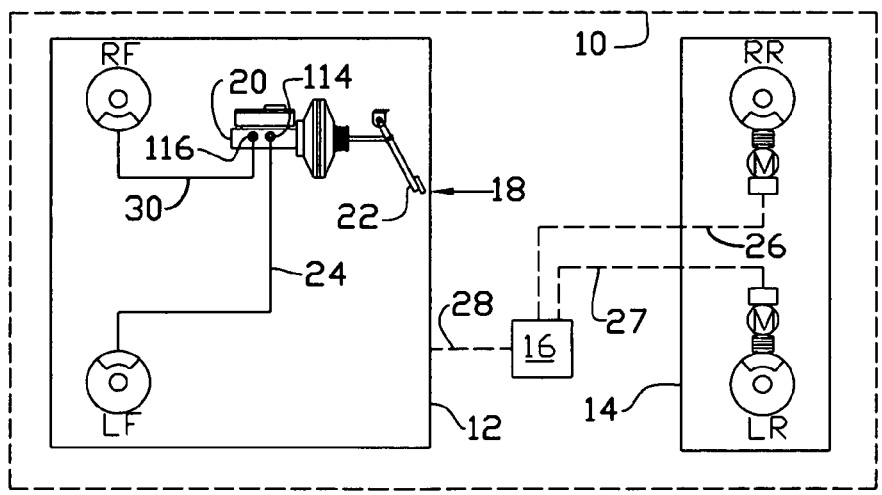
FIG. 3 is a schematic representation of a third embodiment of a brake apparatus according to our invention, providing a Front/Front/Rear/Rear (F/F/R/R) split failsafe hybrid brake system, having a rear electrically actuated brake circuit, and a front hydraulically actuated brake circuit including a first and a second hydraulic circuit, having the first hydraulic brake circuit connected for providing front braking force to a left front braking device, the second hydraulic circuit connected for providing front braking force to a right front braking device, and a rear electrically actuated brake circuit.

FIGS. 1-3 are schematic representations of three exemplary embodiments of a hybrid brake apparatus 10, according to our invention, adapted for use in a vehicle having a left and a right front wheel, and a left and a right rear wheel. As will be apparent from the following description, however, our invention can also be applied in vehicles having more or less than four wheels.

All of the three embodiments depicted in FIGS. 1-3 include a front hydraulically actuated brake circuit 12, a rear electrically actuated brake circuit 14, and a controller 16 for controlling the rear brake circuit 14. During normal, fully functional, operation of the front brake circuit 12, the controller 16 controls the electrically actuated rear brake circuit 14 in accordance with a first predetermined relationship between an input 18 applied to the front hydraulically actuated brake circuit 12, and a desired rear frictional braking force. If the controller 16 detects a degradation of front frictional braking force, however, the controller 18 will control the rear brake circuit 14 in accordance with a second predetermined relationship between the input 18 and the desired rear frictional braking force, to thereby compensate for the degradation of front frictional braking force.

As used herein, the term frictional braking force is intended to encompass conventional disk and drum brakes, and any other form of a braking device that utilizes selective application of friction between a rotating and a non-rotating element of the braking device for applying a braking force to the rotating element. The term normal fully operational braking, as used herein, refers to operation within a set of predetermined parameters, as defined by the vehicle manufacturer, signifying that the hybrid brake apparatus is operating normally, is fully functional, and not in need of repair or maintenance.

The term hybrid braking apparatus, as used herein, includes only hybrid braking apparatuses having a front brake circuit that applies frictional braking force to at least one front wheel of a vehicle solely through application of hydraulic pressure to a braking device in response to an input applied to a master cylinder in the front brake circuit, in combination with a rear, brake-by-wire, brake circuit that applies frictional braking force to at least one rear wheel of a vehicle solely through application of an electrical signal to an electrically actuated braking device acting on the rear wheel, with the electrical signal being the only input to the electrically actuated braking device. The term electrically actuated braking device is intended to include braking devices having an integral electromechanical, or an integral electro-hydraulic mechanism for converting the electrical signal into frictional braking force applied to the rear wheel.

In the embodiment illustrated in FIG. 1, the brake apparatus 10 includes a brake pedal actuated master cylinder 20 for providing pressurized fluid to the front brake circuit 12 in response to an input, in the form of pedal force as indicated by arrow 18, applied to master cylinder 20 by the brake pedal 22. Applying pedal force 18 to the brake pedal 22 causes the master cylinder 20 to generate hydraulic pressure in a first hydraulic circuit 24 of the front hydraulically actuated brake circuit 12. The first hydraulic circuit 24 of the front brake circuit 12 includes a left front braking device LF and a right front braking device RF, operatively attached to the left and right front wheels respectively, for converting the hydraulic pressure generated by the master cylinder 20 into frictional braking force applied to the left and right front wheels.

The rear electrically actuated brake circuit 14, of the embodiment shown in FIG. 1, includes a left rear braking device LR and a right rear braking device RR that are connected to the controller 16 to be controllable independently of one another, for generating frictional braking forces applied to the left and right rear wheels. As shown in FIG. 1, the left and right rear braking devices LR, RR are connected to the controller 16 by separate electrical signal lines 26, 27. It will be understood by those having skill in the art, however that in other embodiments of our invention a single data bus can also be used, instead of separate electrical lines 26, 27, for transmitting digital control signals to the rear braking devices LR, RR.

The controller 16 is connected to the front braking circuit 12, as indicated by line 28, for receiving a signal from the front hydraulic circuit 12 that is indicative of the input 18 applied to the brake pedal 22. The controller 16 generates control signals, in response to the input 18 applied to the master cylinder 20, which are sent to the left and right rear braking devices LR, RR over the lines 26, 27. The left and right rear braking devices LR, RR convert the electrical signals received from the controller 16 into frictional rear braking force applied to the left and right rear wheels.

FIG. 1 represents a basic front/rear/rear (F/R/R) failsafe hybrid braking apparatus 10, according to our invention. Such a F/R/R apparatus has a single front hydraulic braking circuit, in the form of the first hydraulic circuit 24, providing braking force to both the left and right front wheels, in combination with a pair of independently controllable rear braking circuits, in the form of the left and right rear braking devices LR, RR and their associated signal lines 26, 27.

In a F/R/R hybrid braking apparatus, according to our invention, a loss of the signal 28 to the controller 16 results in the loss of braking capability from both of the rear electrically actuated braking devices LR, RR, but both front hydraulic braking devices LF, RF remain fully operational. Conversely, a failure of the first hydraulic circuit 24 will result in both front hydraulic braking devices LF, RF becoming inoperative, but the rear electrically actuated braking devices LR, RR will remain totally operational and controllable in the normal manner using a the signal indicative of the input 18 supplied to the controller 16 over line 28, if the signal indicative of the input is supplied by sensors, such as a pedal travel sensor or a force transducer, in the front hydraulically actuated brake circuit 12 that are not affected by a loss of hydraulic pressure in the first hydraulic circuit 24. In either case, the braking means in two corners of the vehicle 12 remain fully operational after a single failure, thereby meeting regulatory and operational requirements for failsafe operation.

A basic F/R/R hybrid braking apparatus 10 according to our invention provides the desired failsafe operation in a simple, straightforward manner, at low cost. Loss of hydraulic pressure in the first hydraulic circuit 24 of the basic F/R/R system will, however, result in a difference in pedal travel and feel that will be felt by the driver. It may be desirable in some embodiments of our invention to include some form of pedal feel emulation in a basic F/R/R system, as will be described in more detail with respect to alternate embodiments of our invention.

FIG. 2 shows a second embodiment of our invention that is identical to the first embodiment described above in relation to FIG. 1, except that the front hydraulically actuated brake circuit 12 of the second embodiment includes a second hydraulic circuit 30 connected to the master cylinder 20, in addition to the first hydraulic circuit 24. Although the second hydraulic circuit 30, in the second embodiment, receives pressurized hydraulic fluid from the master cylinder 20 in the same manner as the first hydraulic circuit 24, the second hydraulic circuit 30 of the second embodiment is not connected to a braking device.

As will be seen from the description of alternate embodiments of our invention described below, in some embodiments of our invention, the second hydraulic circuit 30 of an F/R/R braking apparatus 10 may include a hydraulic pressure sensor that is used for providing a pressure signal, indicative of the input 18, to the controller 16. Using a hydraulic pressure sensor to provide the signal to the controller 16 is desirable, because such sensors are compact, reliable and inexpensive, and are often already present in modern controlled braking systems to provide input for performing control and diagnostic functions. Using an existing hydraulic pressure sensor to provide the signal to the controller 16 of our invention, in addition to providing signals for other control and diagnostic functions, is desirable in that the cost and complexity of adding an additional sensor is eliminated, and the reliability of the hybrid brake apparatus is enhanced.

Placing a pressure transducer in a second hydraulic circuit 30, according to our invention, that is not connected to the braking devices LF, RF, rather than in the first hydraulic circuit 24, also provides a significant advantage over a basic F/R/R embodiment of our invention, in that the pressure signal will still be available for use by the controller 16 for controlling the rear brake circuit 14 in the event that a leak or break in the first hydraulic circuit 24 should cause a loss of hydraulic pressure in the first hydraulic circuit 24.

As will also be seen from the description below, in some embodiments of our invention, the second hydraulic circuit 30 also includes a pedal feel emulator that provides a more normal pedal feel, in the event that hydraulic pressure is lost in the first hydraulic circuit 24 of front hydraulically actuated brake circuit 12. The second embodiment of our invention, as shown in FIG. 2, therefore provides a F/R/R failsafe braking apparatus 10 that addresses the problems of maintaining control of the rear braking devices LR, RR, and providing pedal feel following a loss of hydraulic pressure in the first hydraulic circuit 24, described above in regard to the basic F/R/R system shown in FIG. 1, with a modest increase in complexity and cost.

FIG. 3 shows a Front/Front/Rear/Rear (F/F/R/R) embodiment of a hybrid braking apparatus 10, according to our invention. The embodiment of FIG. 3 differs from the embodiments shown in FIGS. 1 and 2, in that the first hydraulic circuit 24 of the front hydraulically actuated braking circuit 12 is connected between the master cylinder 20 and only the right left braking device LF, for supplying hydraulic pressure from the master cylinder 20 to only the left front braking device LF, and the second hydraulic circuit 30 of the front hydraulically actuated braking circuit 12 is connected between the master cylinder 20 and only the right front braking device RF, for supplying hydraulic pressure from the master cylinder 20 to only the left front braking device RF.

The first and second hydraulic circuits 24, 30 of the front hydraulically actuated brake circuit 12 are therefore isolated one another, and independently supply pressurized hydraulic fluid to the left and right front braking devices LF, RF, respectively. A leak or break in either of the first or second hydraulic circuits 24, 30 of the front hydraulically actuated brake circuit 12 in an F/F/R/R embodiment of our invention thus results in the loss of braking on only one front corner of the vehicle, leaving the remaining three corners of the vehicle available for braking. Such an arrangement exceeds government requirements that braking be available on at least two corners of the vehicle after a single failure. This additional functionality may be desirable in some vehicle configurations, and may be required in applying our invention on a diagonally split brake system of the type often used in front wheel drive vehicles, where it would be necessary to retain the functionality of having braking available on at least one front and a diagonally opposite rear corner of the vehicle following a single failure.

In the embodiments depicted in FIGS. 2 and 3, the master cylinder 20 includes a first and a second movable piston 114, 116. The first piston 114 is operatively connected for providing front braking by supplying pressurized fluid to the first hydraulic circuit 24 in response to the input 18. The second movable piston 116 is operatively connected for providing front braking force by supplying pressurized fluid to the second hydraulic circuit 30 in response to the input 18.

Figure 4:
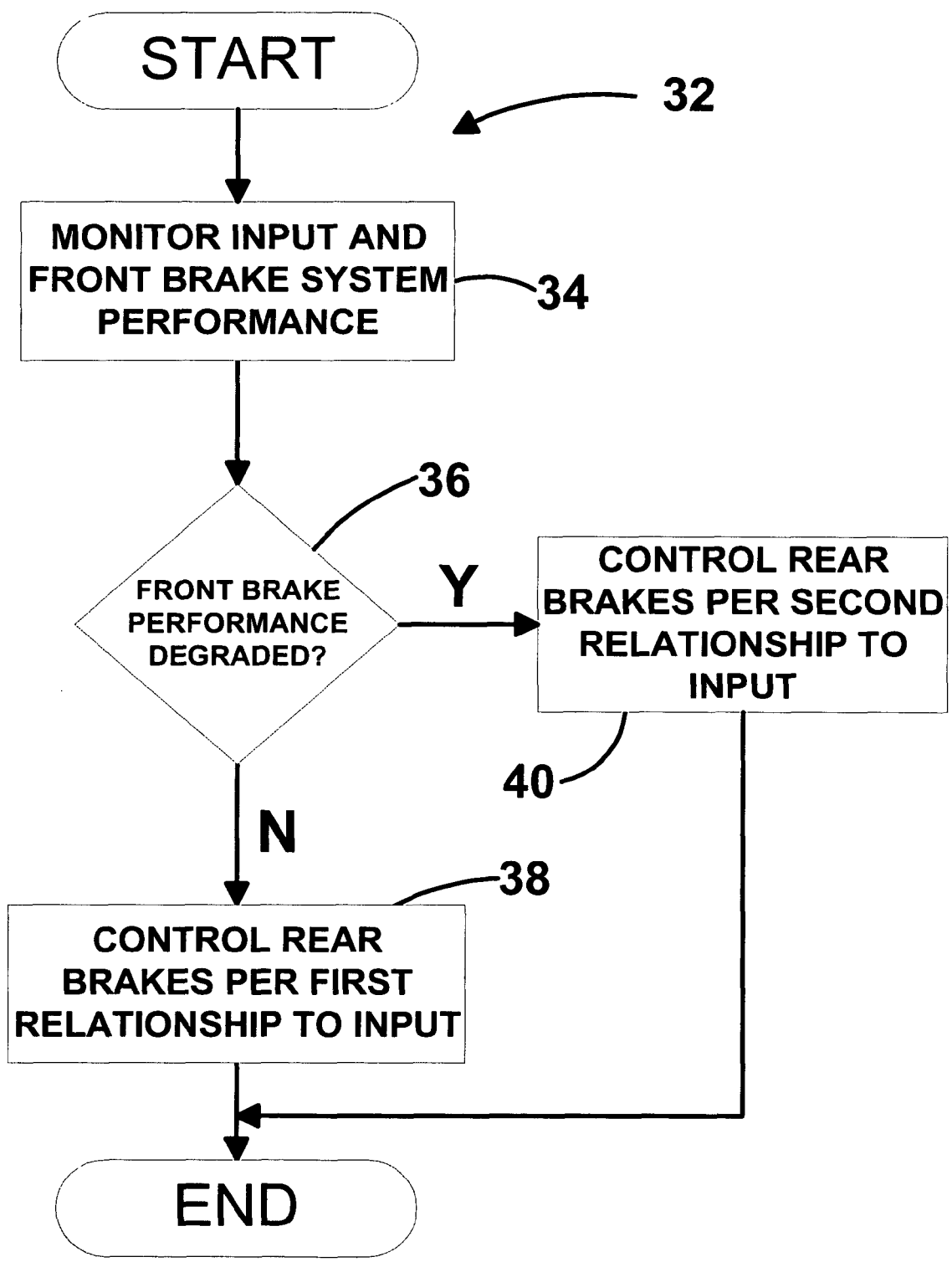
FIG. 4 is a flow chart showing a method according to our invention.

FIG. 4 is a block diagram showing a method 32 for operating a hybrid brake apparatus 10, according to our invention. The controller 16 continually monitors both the input 18 applied to the front hydraulically actuated brake circuit 12, and the performance of the front hydraulically actuated brake circuit 12, as indicated at block 34. The controller 16 continually compares the performance of the front hydraulically actuated brake circuit 12 to predefined parameters indicative that the front hydraulically actuated brake circuit 12 is performing normally, and generating a front braking force, that is in accordance with a predetermined relationship between the input 18 and a desired front braking force, in response to the input 18, as shown at decision diamond 36. If the performance of the front hydraulically actuated brake circuit 12 is within normal parameters of operation, the controller 16 controls the rear electrically actuated brake circuit 14 in accordance with a first predetermined relationship between the input 18 and rear braking force, as shown at block 38. If the controller detects a degradation of front braking force, however, the controller 16 controls the rear brake circuit 14 in accordance with a second predetermined relationship between the input and the rear braking force, to thereby compensate for the degradation of front braking force, as shown at block 40.

The differences between the first and second predetermined relationships of the input 18 to rear braking force may take a number of forms, dependent upon the configuration of the hybrid brake apparatus 10, and the operational requirements for the vehicle in which the hybrid brake apparatus 10 is installed. It may be desirable, for example, in some embodiments of our invention to provide increased or reduced rear braking force at either or both of the left and right rear braking devices LR, RR, in response to a given input 18, when a degradation in front braking force is detected.

The method 32 may also include an additional step of providing pedal feel compensation after detection of a degradation of front braking force. As will be understood from the descriptions below, the front hydraulically actuated brake circuit 12 may include a hydraulically actuated pedal feel emulation device, connected in such a manner that it detects a degradation in front braking force and provides pedal feel emulation, when front braking performance is degraded.

Figure 5:
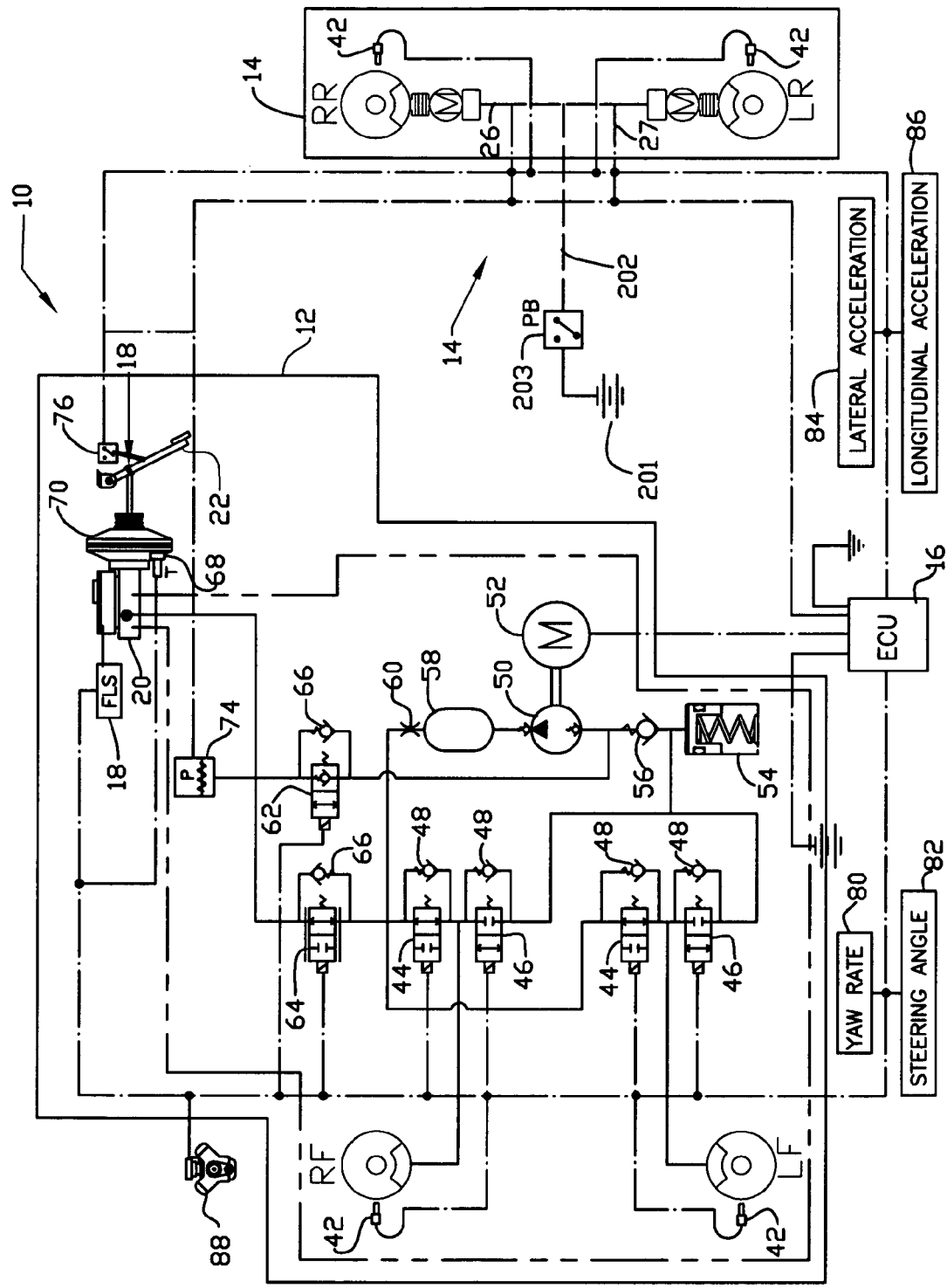
FIGS. 5-15 are schematic and perspective views of alternate embodiments of our invention, and components for use in all embodiments of our invention.

FIG. 5 shows an exemplary embodiment of our invention, in the form of a basic F/R/R braking apparatus 10 as described above in relation to FIG. 1, having a first hydraulic circuit 24, indicated by dashed lines, including a number of components constituting a controlled braking circuit, and a number of sensors used for monitoring the performance of the front hydraulically actuated braking circuit 12.

As shown in FIG. 5, the first hydraulic circuit 24 includes a number of components to provide ABS, TCS, and VDC operation, in addition to the basic brake operation described above. To enable operation in these modes, the hybrid brake apparatus 10 includes a wheel speed sensor 42, electrically connected to a controller, in the form of an electronic control unit (ECU 16), for each of the front hydraulic and rear electrically activated braking devices LF, RF, LR, RR. An inlet control valve 44 and an outlet control valve 46, each having associated therewith an associated bypass check valve 48, are connected to each of the left and right front braking devices LF, RF, for controlling the flow of hydraulic fluid in and out of the left and right front braking devices LF, RF. A hydraulic pump 50, driven by an electric motor 52, is connected via electrical conductors to the ECU 16. The first hydraulic circuit 24 also includes: an inlet accumulator 54; an accumulator check valve 56; a damper chamber 58; a damper orifice 60; a prime valve 62; an isolation valve 64; and bypass check valves 66 associated with the prime and isolation valves 62, 64; for directing fluid flow within the first hydraulic circuit during operation in the various operational modes of the hybrid brake apparatus 10.

The hybrid brake apparatus 10 also includes a pedal travel sensor 68 connected to a brake booster 70 for detecting the input 18, and a hydraulic pressure sensor 74, for sensing hydraulic pressure in the first hydraulic circuit 24 as an indication of braking force being generated by the front hydraulically actuated brake circuit 12. The vehicle and hybrid braking apparatus 10 also include a brake pedal switch 76, a fluid level switch 78, and additional sensors for yaw rate 80, steering angle 82, lateral acceleration 84, and longitudinal acceleration 86. The ECU 16 is also electrically connected to the engine 88 for controlling the engine throttle setting during certain operational modes.

The ECU 16 uses a signal received from the position sensor 68, and optionally from the brake pedal switch 76, for determining the input 18, and a signal from the hydraulic pressure sensor 74 as a primary indicator of front braking performance. The ECU 16 also uses signals from the wheel speed sensors 42 to continually calculate deceleration of the front wheels, in response to the input 18, as a secondary indicator of front braking performance.

If the pressure sensor 74 indicates that hydraulic pressure has been lost in the front hydraulically actuated braking circuit 12, and the deceleration rate calculated from the signals provided by the wheel speed sensors 42 is normal, the controller 16 detects that the pressure sensor 74 is malfunctioning, and continues to control the rear brake circuit 14, according to the first predetermined relationship between the input 18 and the desired rear braking force for normal operation of the hybrid braking apparatus 10, using the signal from the travel sensor 68 to provide a signal indicative of the input 18, and using the deceleration calculated from signals provided by the wheel speed sensors 42 for monitoring front braking force. In such circumstances, normal braking force is provided to all wheels by the hybrid braking apparatus 10, despite the failure of the pressure sensor 74, and brake pedal feel is also normal.

If the signal from the pressure sensor 74 is lost, and the deceleration calculation indicates that hydraulic pressure in the front hydraulically actuated brake circuit 12 has indeed been lost, and thereby also front braking force has been lost, the ECU 16 controls the rear brake circuit 14 in accordance with the second relationship between input 18, as indicated by the position sensor 68, and the rear braking force. When hydraulic pressure is lost in the front hydraulically actuated brake circuit 12, pedal feel is significantly affected, in that, when there is no hydraulic pressure being generated in the master cylinder 20, there is little or no resistance to force applied to the brake pedal 22. The pedal travel will remain normal, however, and the driver can still provide the input 18 for controlling the rear brake circuit 14 by reducing the amount of force applied to the brake pedal 22 for a given distance of pedal travel.

If the travel sensor 68 fails, with the pressure sensor 74 and/or one or more of the wheel speed sensors 42 are still operational, the ECU 16 extrapolates the input 18 from either or both of the hydraulic pressure signal from the pressure sensor 74 and the deceleration calculated from the signals provided by the wheel speed sensors 42, and continues to control the rear brake circuit 14 in accordance with the first relationship between the input 18, as extrapolated, and the desired rear braking force when the front braking circuit 12 is operating normally. If the front hydraulically actuated brake circuit 12 is still operating normally, braking performance and pedal feel are not affected by the loss of the travel sensor 68.

From the description above, those having skill in the art will recognize that, if hydraulic pressure is lost in the front brake circuit 12, in addition to the loss of the ECU 16 or travel sensor 76, there would be no means of transmitting the input 18 to the rear electrically actuated brake circuit 14, which would render the rear electronically actuated brake circuit 14 be inoperative. Pedal feel would also be lost.

To provide emergency braking, in such circumstances, the embodiment, shown in FIG. 5, also includes an emergency brake circuit 200, that is separate from the ECU 16 for actuating the rear braking devices LR, RR, for use as emergency brakes, in the event that there is a failure, or combination of failures in the front hydraulically actuated brake circuit 12, or in the ECU 16, that would otherwise render the rear brake circuit 14 inoperative. The emergency brake circuit 200 includes a parking brake controller 203, operatively connected to a battery 201, that generates a signal fed directly to the rear brake circuit 14, via a separately isolated electrical line 202, for utilizing the rear brake circuit 14 to provide a parking or emergency brake function. The parking brake controller 203 may be a simple park brake switch, actuated by a parking brake lever or pedal (not shown).

Although the other exemplary embodiments of our invention, described herein, do not expressly disclose the separate emergency brake circuit 200 shown in FIG. 5, it will be understood that it may be desirable in embodiments of our invention to also include a separate emergency brake circuit, such as the one described above in relation to the embodiment shown in FIG. 5

Figure 6:
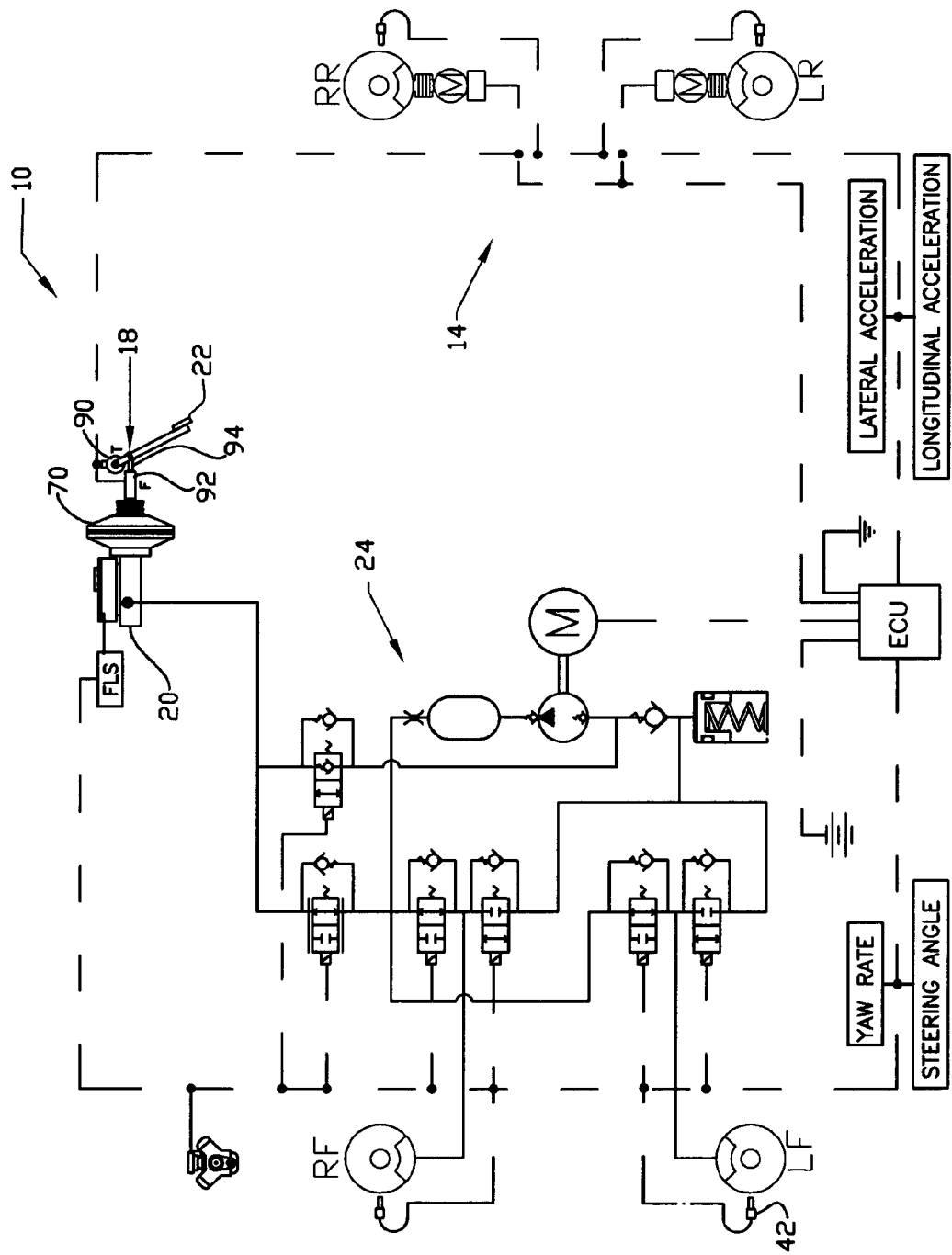

FIG. 6 is an embodiment of a basic F/R/R hybrid brake apparatus 10, according to our invention, that is identical to the embodiment shown in FIG. 5, except that the travel sensor 68, attached to the brake booster 70, and the pressure sensor 74 of the embodiment shown in FIG. 5 are respectively replaced by a combination travel sensor and brake switch 90 operatively attached to the brake pedal 22, and a force transducer 92 in a push rod 94 connecting the brake pedal 22 to the master cylinder 20.

Using a travel sensor 90 attached to the brake pedal 22, instead of a travel sensor 74 attached to the brake booster 70 as described above in regard to the embodiment of FIG. 5, for detecting the input 18 has no affect on overall performance of the system, and is largely a matter of design choice. System diagnostics will be somewhat affected by moving the travel sensor to a location operatively upstream of the booster 70.

Using a force transducer 92, instead of a pressure sensor 74, for monitoring performance of the front braking circuit 12 provides an advantage in that if front hydraulic pressure is lost, the force transducer 92 can still be utilized in addition to travel sensor for extrapolating the input 18. If both the travel sensor 90 and the hydraulic pressure in the front brake circuit 12 are lost, the force transducer 92 can be utilized for providing a signal to the ECU 16 that is indicative of the input 18, for controlling the rear brake circuit 14 in accordance with the second relationship between the input 18 and rear braking force.

Figure 7:
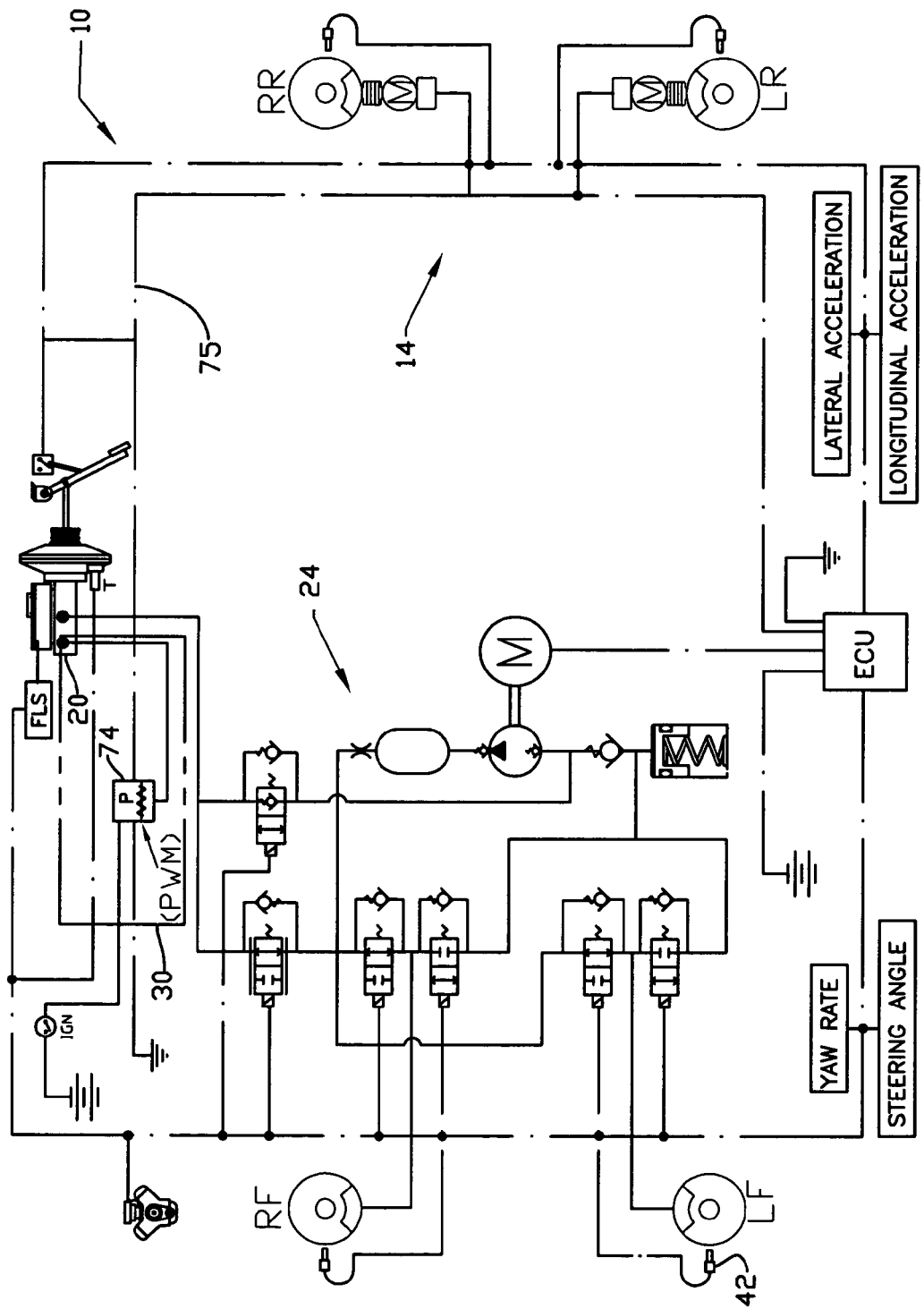

FIG. 7 shows an exemplary embodiment of our invention, in the form of a F/R/R braking apparatus 10 as described above in relation to FIG. 2, having a first hydraulic circuit 24, connected for supplying pressurized hydraulic fluid to the front braking devices LF, RF, and a second hydraulic circuit 30, indicated by dashed lines, that is not connected to either of the front braking devices LF, RF. The embodiment of FIG. 7 is identical to the embodiment described above in relation to FIG. 5, except for the addition of the second brake circuit 30, and the location of the hydraulic pressure sensor 74.

In the embodiment of FIG. 7, the hydraulic pressure sensor 74 is connected to the second hydraulic circuit 30, rather than to the first hydraulic circuit 24, as was the case in the embodiment of FIG. 5. Moving the pressure sensor 74 to a second hydraulic circuit 30 that is not connected to the front braking devices LF, RF provides an advantage in that the pressure signal from the pressure sensor 74 will not be lost if hydraulic pressure and braking force are lost in the front hydraulically actuated brake circuit 12. The pressure signal is still available for use by the ECU 16 in controlling the rear brake circuit 14, following a loss of the front brake circuit 12.

It may also be desirable in some embodiments of our invention, in accordance with FIG. 7, to provide a separate electronic controller as part of the pressure sensor that can optionally provide a pulse width modulated (PWM) signal directly to the rear braking devices LR, RR, as indicated by line 75 in FIG. 7, for controlling the rear braking devices LR, RR independently from the ECU 16 used for controlling the various control valves (50, 52, 62, 64) of the controlled braking system located in the first hydraulic circuit 24.

Figure 8:
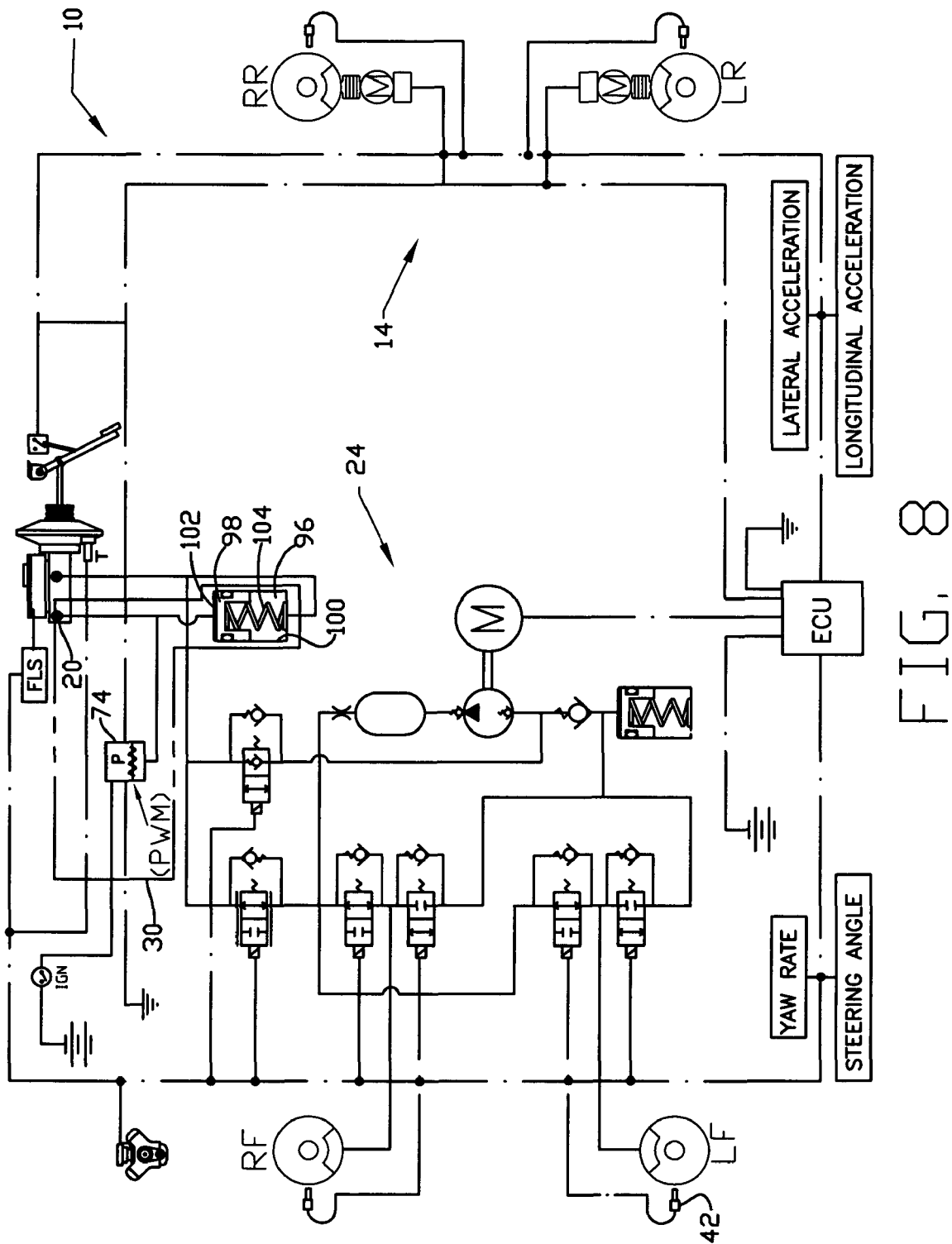

FIG. 8 also shows an exemplary embodiment of our invention, in the form of a F/R/R braking apparatus 10 as described above in relation to FIG. 2, having a first hydraulic circuit 24, connected for supplying pressurized hydraulic fluid to the front braking devices LF, RF, and a second hydraulic circuit 30, indicated by dashed lines, that is not connected to either of the front braking devices LF, RF. The embodiment of FIG. 8 is identical to the embodiment described above in relation to FIG. 7, except for the addition of a pedal feel emulator 96 in the second brake circuit 30.

The pedal feel emulator 96 of FIG. 8 includes a movable piston 98 separating a first and a second internal chamber 100, 102 from one another. The first internal chamber 100 is connected to the first hydraulic circuit 24, and the second internal chamber 102 is connected to the second hydraulic circuit 30. By virtue of this arrangement, as long as the first hydraulic circuit 24 is operating normally, the pressure on either side of the movable piston 98 is the same, and the pedal feel emulator 96 is inoperative. The pedal feel emulator 96 includes a spring element 104 for resisting movement of the movable piston 98 from the second internal chamber 102 toward the first internal chamber 100 of the pedal feel emulator 96.

The spring element 104 provides a force resisting movement of the movable piston 98, if hydraulic pressure is lost in the first hydraulic circuit 24, to thereby emulate the pedal feel experienced by the driver when the front hydraulically actuated brake circuit 12 is operating normally. To achieve a compact size of the pedal feel emulator 96, while providing an appropriate spring force and rate, it is desirable to fabricate the spring element 104 from a compliant material, such as rubber, or an elastomer, that provides a relatively high spring rate in a small space.

Figure 9:
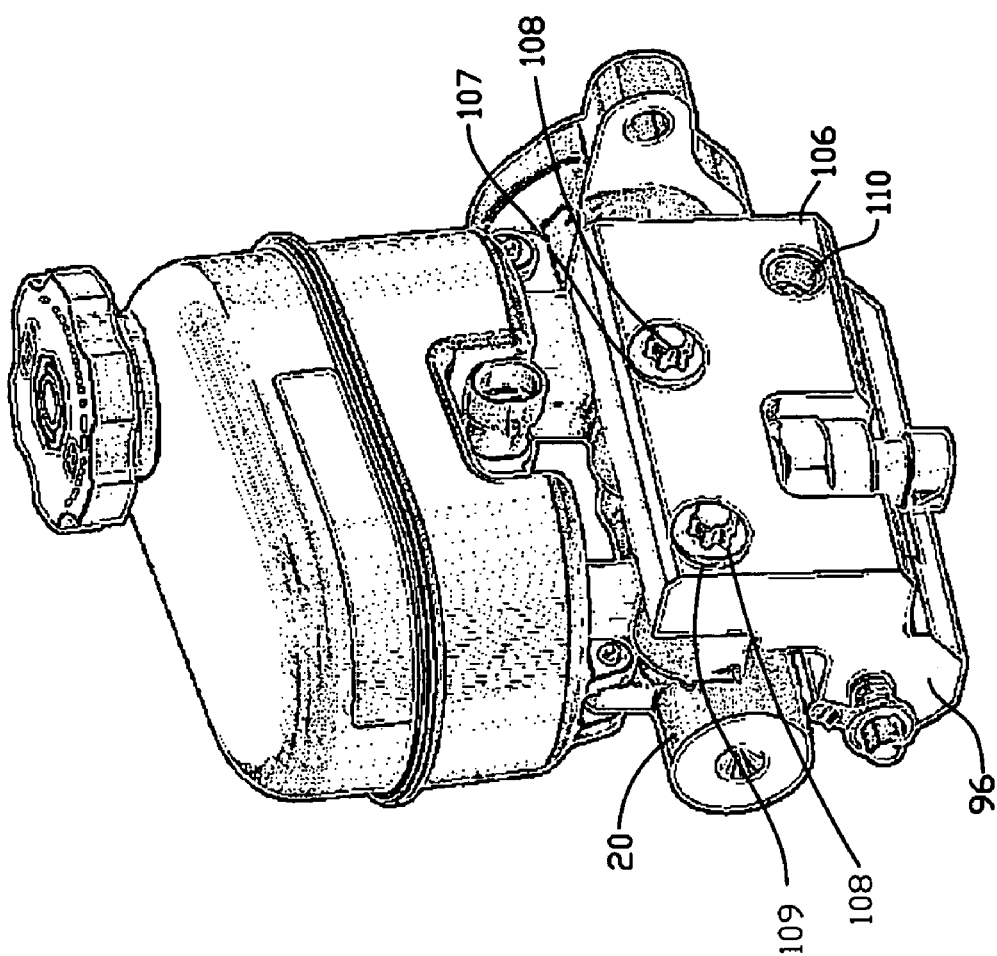
Figure 10:
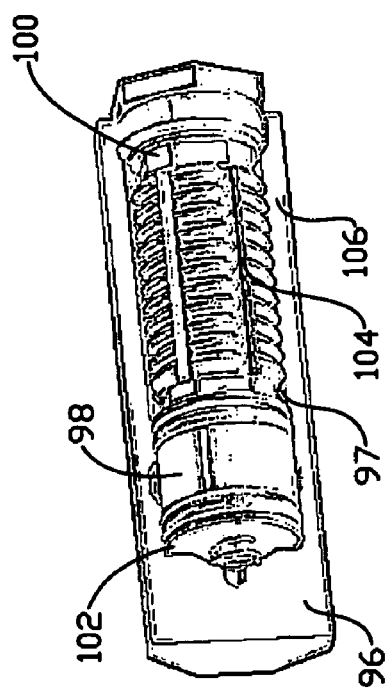

FIGS. 9 and 10 show an exemplary embodiment of a compact pedal feel emulator 96, having a compliant spring element 104. The pedal feel emulator 96 includes an emulator housing 106 having a cylinder bore 97 defining the first and second internal chambers 100, 102, and housing the movable piston 98 and compliant spring element 104. The emulator housing 106 is attached directly to a master cylinder 20 of conventional construction, having a primary port 107 receiving pressurized hydraulic fluid from a primary piston (not shown) and a secondary port 109 receiving pressurized hydraulic fluid from a secondary piston (not shown) as is known in the art. The emulator housing 106 is attached to master cylinder by a pair of banjo bolts 108, in a manner known in the art, that engage the primary and secondary ports 107, 109 and direct fluid from the ports 107, 109 through internal passages in the emulator housing 106 to the first and second internal chambers 100, 102 respectively of the pedal feel emulator 96. The emulator housing 106 also defines a port 110 for connecting the master cylinder 20 to the first hydraulic circuit 24.

Figure 11:
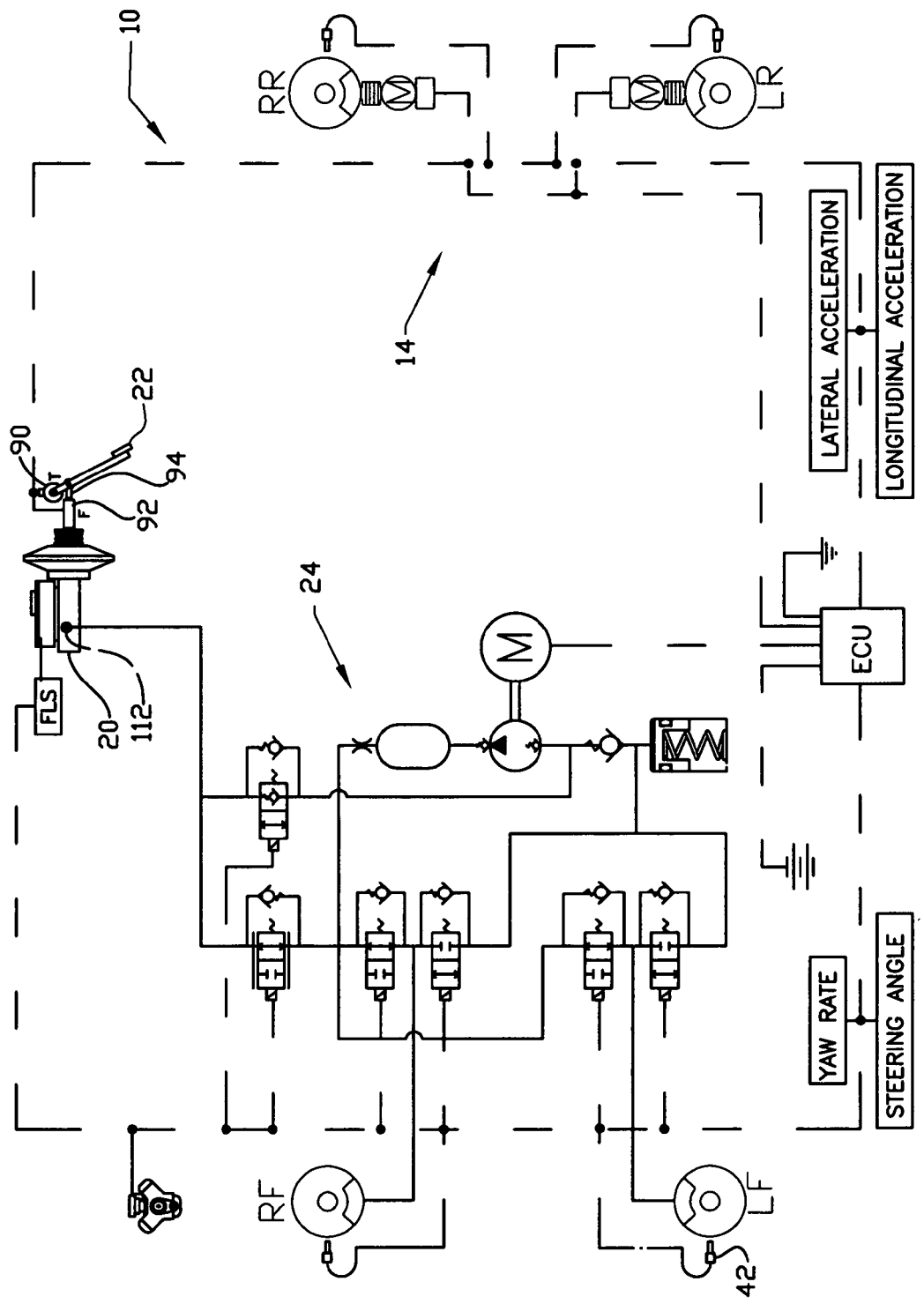
Figure 12:
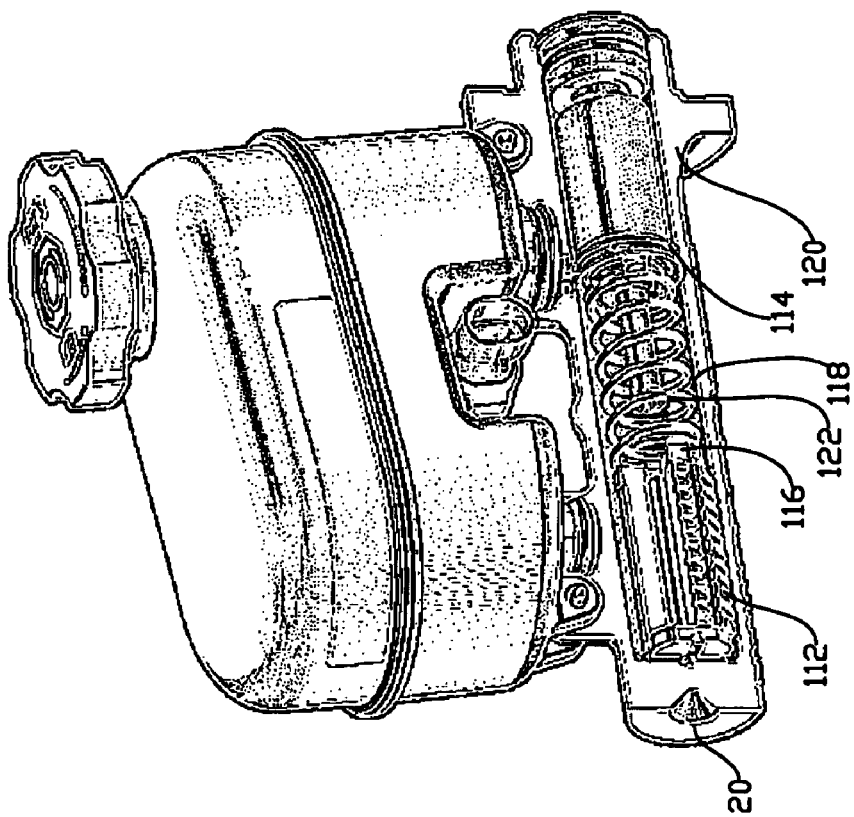

FIG. 11 is an embodiment of a basic F/R/R hybrid brake apparatus 10, according to our invention, that is identical to the embodiment shown in FIG. 6, except that the master cylinder 20, as shown in FIG. 12, includes an internal compliant spring 112, for providing pedal feel emulation in the event of a loss of hydraulic pressure in the first hydraulic circuit 24. If pressure is lost, due to fluid leakage, or a break in the first hydraulic circuit 24, a movable piston 114 inside of the master cylinder 20 moves into contact with the compliant spring element 112. Once the piston 114 is in contact with the compliant spring element 112, the compliant spring element 112 provides resistance to further travel of the piston 114. By virtue of this arrangement near normal pedal feel can be provided, at a lower pedal height, after the pedal 22 has traveled a sufficient distance to bring the piston 114 into contact with the compliant spring element 114.

Figure 13:
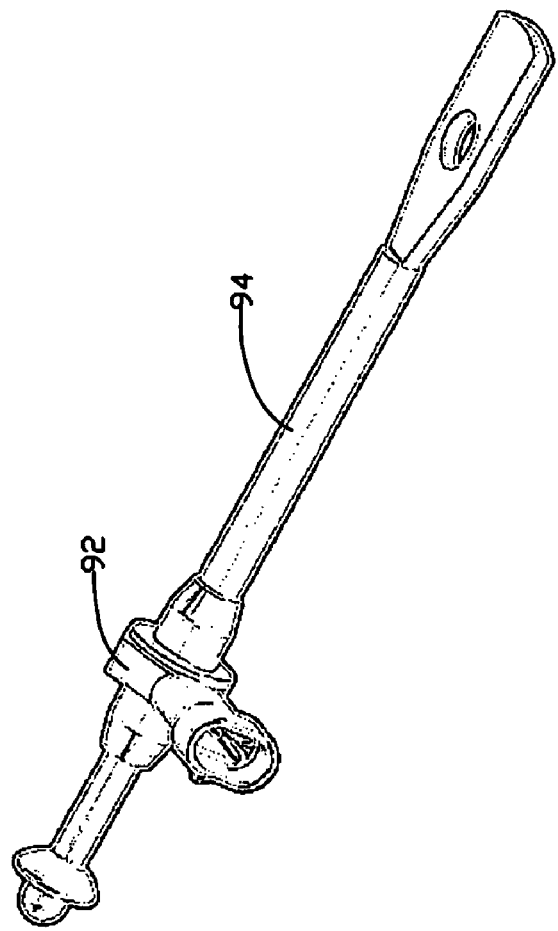

FIG. 13 shows a push rod 94 including a force transducer 92, in accordance with the embodiments described above in relation to FIGS. 6 and 11.

Figure 14:
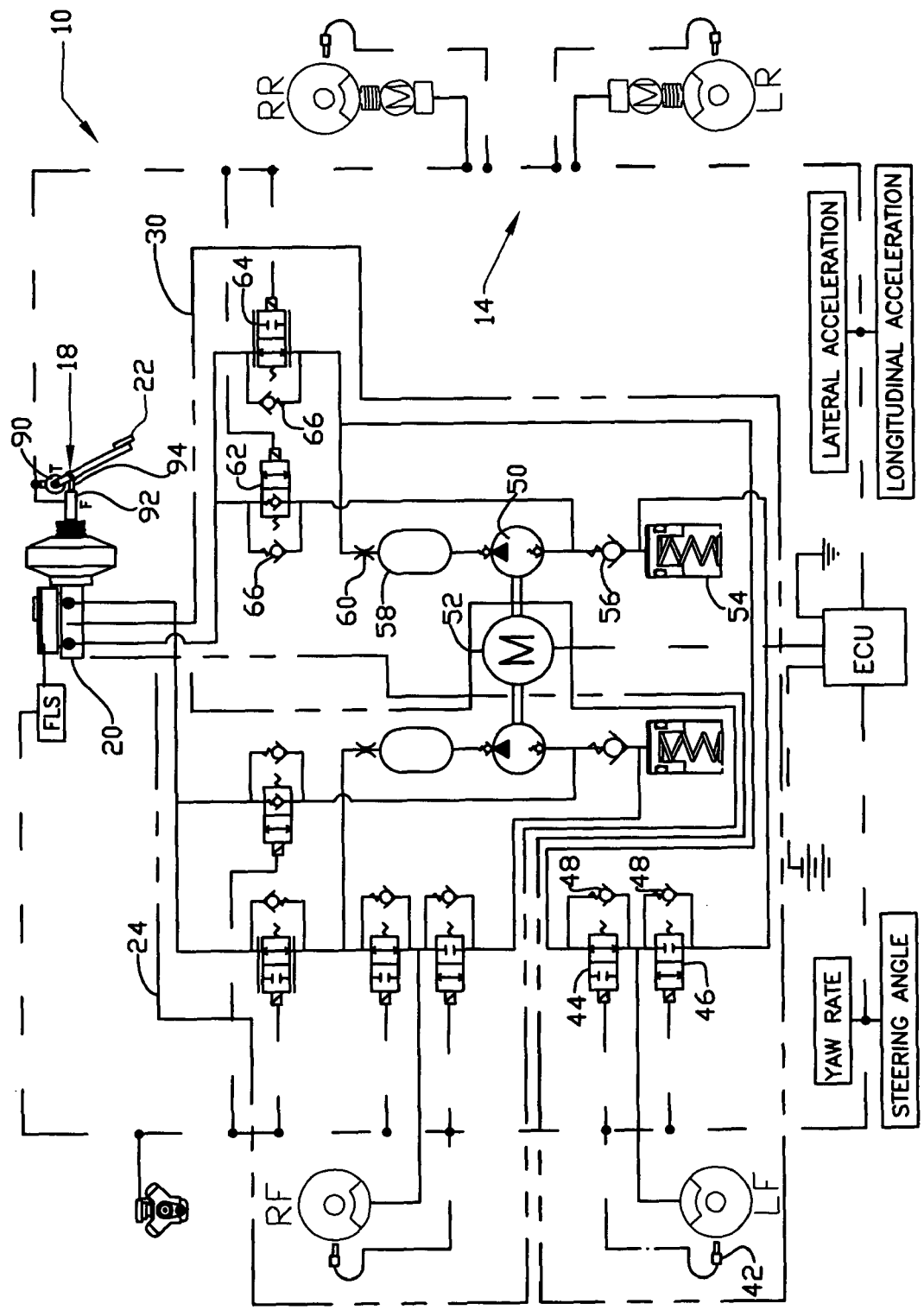

FIG. 14 shows an exemplary embodiment of our invention, in the form of a F/F/R/R braking apparatus 10 as described above in relation to FIG. 3, having a first hydraulic circuit 24, as described above in relation to FIG. 5, but connected to only the left front braking device LF, and a second hydraulic circuit 30, indicated by dashed lines, connected to only the right front braking device RF. The second hydraulic circuit 30 includes a number of components constituting a controlled braking circuit, and a number of sensors used for monitoring the performance of the front hydraulically actuated braking circuit 12.

As shown in FIG. 14, the second hydraulic circuit 30 includes a number of components to provide ABS, TCS, and VDC operation, in addition to the basic brake functions of a F/F/R/R hybrid brake apparatus 10 described above in relation to FIG. 3. The components in the first and second hydraulic circuits 24, 30 are identical. The pumps 50 in both the first and second hydraulic circuits 24, 30 are driven by a single motor 52, shared by both circuits 24, 30.

The second hydraulic circuit 30 of the embodiment of FIG. 14 includes an inlet control valve 44 and an outlet control valve 46, each having associated therewith an associated bypass check valve 48, connected to the left front braking device LF, for controlling the flow of hydraulic fluid in and out of the left front braking device LF. A hydraulic pump 50, driven by the shared electric motor 52, is connected via electrical conductors to the ECU 16. The second hydraulic circuit 30 also includes: an inlet accumulator 54; an accumulator check valve 56; a damper chamber 58; a damper orifice 60; a prime valve 62; an isolation valve 64; and bypass check valves 66 associated with the prime and isolation valves 62, 64; for directing fluid flow within the second hydraulic circuit during operation in the various operational modes of the hybrid brake apparatus 10.

The F/F/R/R hybrid brake apparatus 10 of FIG. 14 also includes a combination travel sensor and brake switch 90 operatively attached to the brake pedal 22, and a force transducer 92 in a push rod 94 connecting the brake pedal 22 to the master cylinder 20, as described above in relation to FIGS. 6 and 11. The embodiment of FIG. 14 provides functionality that exceeds government standards, by providing a hybrid braking apparatus 10 in which a loss of hydraulic pressure in either of the first or the second hydraulic circuits 24, 30 still results in the ability to provide hydraulic braking on the other front corner of the vehicle, in addition to providing full control of the rear brake circuit 14. Neither the force transducer 92 nor and travel sensor 90 are rendered inoperative by a loss of hydraulic pressure in either the first or the second hydraulic circuits 24, 30.

In the embodiment, shown in FIG. 14, the ECU 16 uses signals from the travel sensor 90, and the force transducer 92, in conjunction with a deceleration calculated for each front wheel from the wheel speed sensor 42 associated with that wheel, for detecting a degradation of front braking force caused by the loss of braking force at one of the left or right front braking devices LF, RF. The rear brake circuit 14 is controlled accordingly. Pedal feel will be substantially normal, but at a lower initial height, after a loss of hydraulic pressure in either of the first or the second hydraulic circuits 24, 30. Even if hydraulic pressure is lost in both the first and second hydraulic circuits, the rear brake circuit 14 can still be controlled from the signals provided by the force and travel sensors 92, 90, and deceleration calculated from the signals provided by the wheel speed sensors 42, but pedal feel will be lost in the same manner described above in relation to other embodiments, without pedal feel emulators 96, that have lost all hydraulic pressure from the master cylinder 20.

Figure 15:
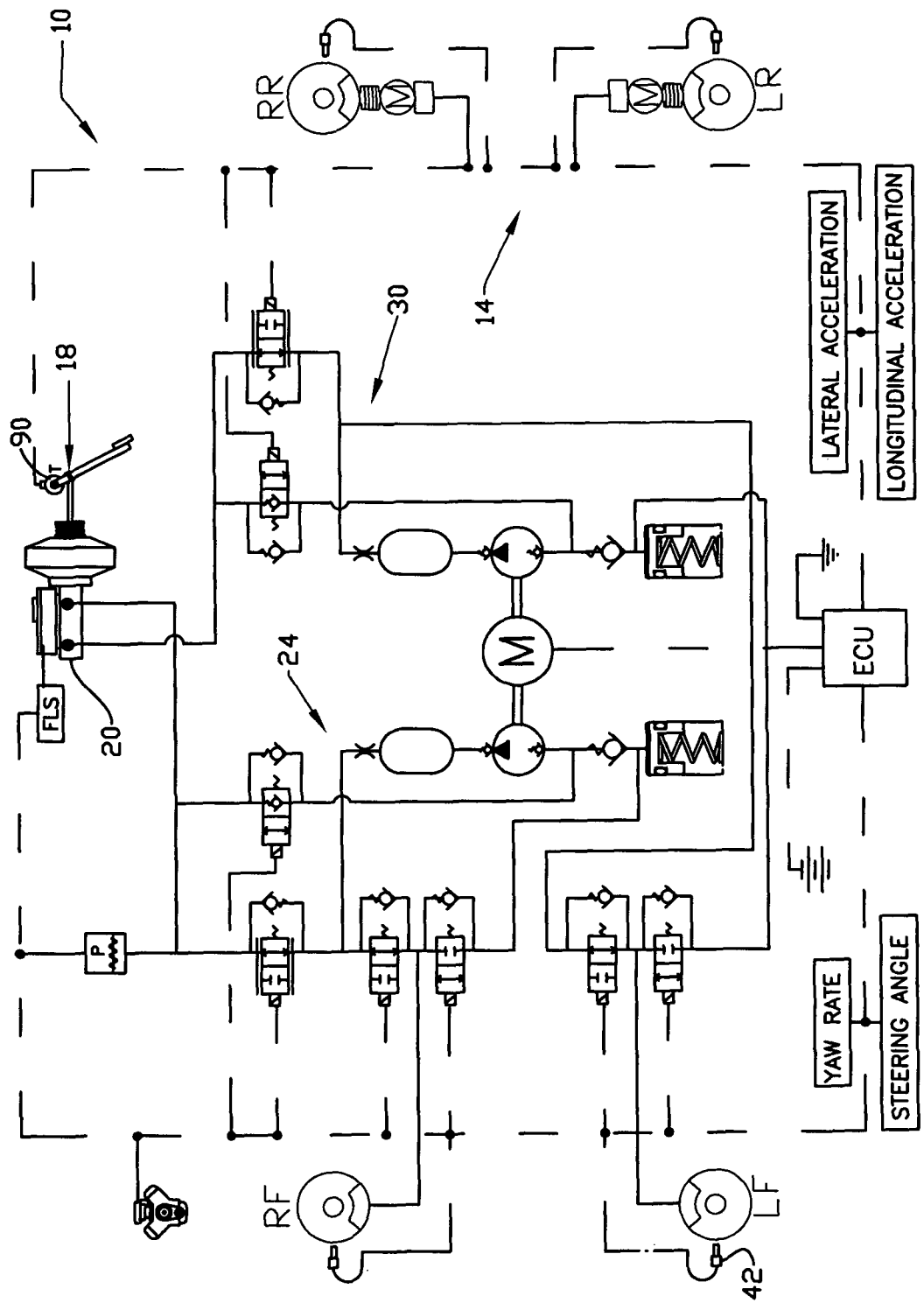

FIG. 15 shows an exemplary embodiment of our invention, in the form of a F/F/R/R braking apparatus 10 as described above in relation to FIG. 3, which is identical to the embodiment shown in FIG. 14, except that the force transducer 92 of the embodiment shown FIG. 14 is replaced by a pressure transducer 74 connected to the first hydraulic circuit 24 for detecting a degradation of front braking force. With this arrangement, if hydraulic pressure is lost in the first hydraulic circuit 24, the signal from the pressure transducer 74 is also lost. If pressure is lost, the ECU 16 will detect a degradation of front braking force, and will use the signal from the travel sensor 90, as an indicator of the input 18, for controlling the rear brake circuit 14 in accordance with a second relationship between the input 18 and a desired rear braking force. If the wheel speed sensors 42 and/or travel sensor 90 indicate that the remaining front braking device is providing front braking force, the ECU 16 may individually increase or reduce braking force applied by the left and right rear braking devices LR, RR, to optimize braking efficiency and control with braking force being applied on three of the four corners of the vehicle.

The master cylinders 20 in the F/R/R embodiments of FIGS. 3, 7 and 8, and the F/F/R/R hybrid braking apparatuses of FIGS. 14 and 15, all of which have both a first and a second hydraulic circuit 24, 30 can be equipped with an internal compliant spring element 112, in the manner shown in FIG. 12. In such master cylinders 20, the compliant spring element 112 can be disposed within a cylinder bore 118 of a master cylinder housing 120, between a secondary piston 116 of the master cylinder 20 and the master cylinder housing 120. In accordance with standard construction of dual piston master cylinders 20, the primary piston 114 of the master cylinder 20 will only come into contact with the compliant spring element 112 after fluid pressure has been lost in a primary cavity 122 formed in the master cylinder bore 118 between the primary and secondary pistons 114, 116.

Those having skill in the art will recognize that, while we presently consider it preferable to have the components according to our invention arranged as described above, we contemplate many other arrangements within the scope of our invention. Our invention may also be practiced in embodiments other than those depicted, providing only basic brake functions, and with other combinations of additional operating modes such as, but not limited to, ABS, TCS and VDC. The booster used in some forms of our invention may be of a type other than the vacuum driven booster described above.

The pedal feel emulator 96 may be provided in many other forms, and configured as a stand-alone component, or incorporated into system elements other than the master cylinder 20. Devices other than the compliant spring element 104, 112, including bellows, diaphragms, or pressure bladders, etc., may be utilized to provide spring force in the pedal feel emulator 96 or a master cylinder 20. Our invention is also applicable to vehicles having more or less wheels than depicted in the exemplary embodiments, and to friction brake means of types other than the caliper brakes illustrated in the exemplary embodiments.

In summary therefore, while the embodiments of our invention disclosed herein are presently considered to be preferred, various changes and modifications can be made without departing from the spirit and scope of the invention. The scope of the invention is indicated in the appended claims, and all changes or modifications within the meaning and range of equivalents are intended to be embraced therein.

We claim:

1. A method for operating a hybrid brake apparatus having a front hydraulically actuated brake circuit including a master cylinder for providing pressurized fluid to the front brake circuit in response to an input applied to a brake pedal connected to the hybrid braking apparatus to apply a frictional front braking force, and a rear electrically actuated brake circuit actuated by a control signal from a controller to produce a frictional rear braking force, the method comprising:

providing a pedal travel sensor for detecting the input to the brake pedal, said pedal travel sensor operatively connected to the controller, and generating a control signal by said controller in response to input detected by the pedal travel sensor;

monitoring the pressurized fluid within the front brake circuit to determine performance of the front brake circuit, and comparing the monitored performance to parameters indicative of normal operation of the front brake circuit in response to the input;

when the monitored performance indicates normal operation of the front brake circuit, providing the control signal to control the rear brake circuit in accordance with a first predetermined relationship between the input and rear braking force during normal operation of the front brake circuit; and when the monitored performance indicates degradation of the front brake circuit, providing the control signal to control the rear brake circuit in accordance with a second predetermined relationship between the input and the rear braking force, to thereby compensate for the degradation of front braking force.

2. The method of claim 1, wherein the second predetermined relationship increases braking force applied by the rear brake circuit in response to the input.

3. The method of claim 1 wherein the second predetermined relationship between the input and rear braking force includes compensation for changes in pedal force and pedal travel resulting from the degradation of front braking force.

4. The method of claim 3 further comprising providing a pedal feel emulator operatively attached to the master cylinder to compensate for changes in one or both of pedal force and pedal feel resulting from the degradation of front braking force.

5. The method of claim 4 further comprising providing pedal feel emulation in the pedal feel emulator with a rubber compression spring.

6. The method of claim 1 wherein the master cylinder includes a movable piston thereof for generating a hydraulic pressure in the front brake circuit in response to the input, and the method further comprises, monitoring the front braking force with a hydraulic pressure sensor operatively attached to the master cylinder.

7. The method of claim 6 wherein the brake apparatus is adapted for installation in a vehicle having at least one front wheel controllable by the front braking force, and at least one rear wheel controllable by the rear braking force, and the method further comprises, monitoring front braking force with a wheel speed sensor operatively attached for sensing the rotational speed of the at least one front wheel.

8. The method of claim 6 wherein the front brake circuit includes a first and a second hydraulic circuit, and the master cylinder includes a first movable piston operatively connected for supplying pressurized fluid to the first brake circuit in response to the input and a second movable piston operatively connected for supplying pressurized fluid to the second hydraulic circuit in response to the input, and the method further comprises, providing front braking pressure with the first hydraulic circuit and operatively connecting the pressure sensor to the second hydraulic circuit for monitoring pressure generated by the second piston of the master cylinder.

9. A hybrid brake apparatus comprising:
   a front hydraulically actuated brake circuit including a master cylinder for providing pressurized fluid to the front brake circuit to apply a frictional front braking force and a brake pedal for applying an input to the master cylinder
   a pedal travel sensor for detecting the input by the brake pedal;
   means for monitoring the pressurized fluid within the front brake circuit to determine performance of the front brake circuit;
   a rear electrically actuated brake circuit operable in response to the input applied to the brake pedal to provide a frictional rear braking force; and
   a controller for generating a control signal for actuating the rear brake circuit in response to input to the brake pedal detected by the pedal travel sensor, said controller comparing the pressurized fluid to parameters indicative of normal operation of the front brake circuit in response to the input and providing the control signal for controlling the rear brake circuit in accordance with a first predetermined relationship between the input and rear braking force when the monitored performance is indicative of normal operation of the front brake circuit, and for controlling the rear brake circuit in accordance with a second predetermined relationship between the input and the rear braking force when the monitored performance is indicative of degradation of the front braking force.

10. The hybrid brake apparatus of claim 9, wherein the second predetermined relationship increases braking force applied by the rear brake circuit in response to the input.

11. The brake apparatus of claim 9 wherein the second predetermined relationship between the input and rear braking force includes compensation for changes in pedal force and pedal travel resulting from the degradation of front braking force.

12. The hybrid brake apparatus of claim 11 further comprising a pedal feel emulator operatively attached to the master cylinder to compensate for changes in either or both of pedal force and pedal feel, resulting from the degradation of front braking force.

13. The hybrid brake apparatus of claim 12 wherein the pedal feel emulator includes a rubber compression spring.

14. The hybrid brake apparatus of claim 13 wherein the pedal feel emulator is disposed within the master cylinder.

15. The hybrid brake apparatus of claim 9 wherein the master cylinder includes a movable piston thereof for generating a hydraulic pressure in the front brake circuit in response to the input, and a hydraulic pressure sensor for monitoring both the input and front braking force.

16. The hybrid brake apparatus of claim 15 wherein the brake apparatus is adapted for installation in a vehicle having at least one front wheel controllable by the front braking force, and at least one rear wheel controllable by the rear braking force, and the brake apparatus further comprises a wheel speed sensor operatively attached for monitoring front braking force by sensing the rotational speed of the at least one front wheel.

17. The hybrid brake apparatus of claim 15 wherein the front brake circuit includes a first and a second hydraulic circuit, and the master cylinder includes a first and a second movable piston, the first piston operatively connected for providing front braking force by supplying pressurized fluid to the first hydraulic circuit in response to the input, the second movable piston operatively connected for supplying pressurized fluid to the second hydraulic circuit in response to the input, and the pressure sensor is operatively connected to only the second hydraulic circuit for monitoring pressure generated by the second piston of the master cylinder.

18. The hybrid brake apparatus of claim 15 wherein the front brake circuit includes a first and a second hydraulic circuit, and the master cylinder includes a first and a second movable piston, the first piston operatively connected for providing front braking by supplying pressurized fluid to the first hydraulic circuit in response to the input, the second movable piston operatively connected for providing front braking force by supplying pressurized fluid to the second hydraulic circuit in response to the input, and the pressure sensor is operatively connected to only the first hydraulic circuit for monitoring pressure generated by the first piston of the master cylinder.

\* \* \* \* \*

UNITED STATES PATENT AND TRADEMARK OFFICE
CERTIFICATE OF CORRECTION

| | | |
|---|---|---|
| PATENT NO. | : 7,976,109 B2 | Page 1 of 1 |
| APPLICATION NO. | : 10/681638 | |
| DATED | : July 12, 2011 | |
| INVENTOR(S) | : David F. Reuter, E. Wayne Lloyd and Deron C. Littlejohn | |

It is certified that error appears in the above-identified patent and that said Letters Patent is hereby corrected as shown below:

Column 1, Line 51: "Modem" should read -- Modern --.

Signed and Sealed this

Twenty-seventh Day of September, 2011

David J. Kappos
*Director of the United States Patent and Trademark Office*